United States Patent [19]

Hertrich

[11] Patent Number: 4,720,913
[45] Date of Patent: * Jan. 26, 1988

[54] MECHANISM FOR JOINING TAPE LEADERS

[75] Inventor: Friedrich R. Hertrich, Boulder, Colo.

[73] Assignee: Digital Equipment Corporation, Maynard, Mass.

[*] Notice: The portion of the term of this patent subsequent to May 5, 2004 has been disclaimed.

[21] Appl. No.: 824,189

[22] Filed: Jan. 31, 1986

Related U.S. Application Data

[62] Division of Ser. No. 578,766, Feb. 13, 1984, Pat. No. 4,662,049.

[51] Int. Cl.$^4$ ............................................. B23P 19/00
[52] U.S. Cl. ...................................... 29/819; 29/267; 29/283; 242/195
[58] Field of Search ................ 29/819, 806, 270, 283, 29/267, 244; 242/195; 226/90, 91

[56] References Cited

U.S. PATENT DOCUMENTS

| | | | |
|---|---|---|---|
| 1,655,297 | 1/1928 | Thornton | 242/74 |
| 3,197,150 | 7/1965 | Camras | 242/195 |
| 3,655,145 | 4/1972 | Olsen | 242/195 |
| 3,706,423 | 12/1972 | Neff | 242/195 |
| 4,090,680 | 5/1978 | Karsh | 242/195 |

*Primary Examiner*—Howard N. Goldberg
*Assistant Examiner*—Irene Graves Golabi
*Attorney, Agent, or Firm*—William E. Cleaver

[57] ABSTRACT

The present system for joining tape leaders is comprised of an elongated member which has a finger like protrusion and a cam protrusion both of which are disposed close to one end thereof. The elongated member has an elongated slot at one end which fits over a stud and is further rotationally coupled to a crank so that the elongated member can pivot around said stud in a number of different positions in response to the crank being moved. The crank is rotationally coupled to a cam follower and the crank is further arranged to rotate about a stud.

10 Claims, 7 Drawing Figures

MECHANISM FOR JOINING TAPE LEADERS

This is a division of application Ser. No. 06/578,766, filed Feb. 13, 1984, now U.S. Pat. No. 4,662,049.

BACKGROUND

In tape handling devices it is necessary to have a reel which is "taking up," or winding the tape that is coming off the supply reel. Very often, in the prior art, the take up reel and the supply reel are not distinguishable because each acts to either "take up" or "supply" depending on which way the tape is being run. It is also true, in the prior art, that both reels are often located in the same housing, such as a cassette.

However there are some applications in the prior art where the supply reel is provided as an entity unto itself and the tape thereon is pulled therefrom onto an "empty" take up reel. A film on a motion picture projector is a typical example. Other uses of this kind are well known. In the prior art, with such arrangements, there has always been a certain amount of human factor involved. For instance in a motion picture projector arrangement, the film is threaded along a group of sprocketed drivers and idlers. In some other arrangements, the tape is pulled from the supply reel and "grabbed" by a vacuum port on the take up reel. In another arrangement the tape is pulled from the supply reel and hand loaded onto a take up reel whereat there is a sheath. The sheath in response to movement of the take up reel, operates to squeeze the tape and hold it in position while the tape winds on itself.

The present system provides a means for a minimum of human intervention in making ready a system to pull tape from a supply reel onto a take up reel.

SUMMARY

The present system is involved (in a preferred embodiment) with two tape leaders which in and of themselves are novel. The tape leader from the take up reel has a tab on its end which (in a preferred embodiment) is substantially mushroom shaped including a stem section. Below the stem section there is located a positioning slot. The tape leader from the supply reel has a locking slot in close proximity to its end. The locking slot is wide enough at one section to pass over the tab and is narrow enough at another section (in the end of the locking slot) so that as the tab is moved into that end, the stem passes through but the tab becomes blocked. The leader per se are the subject of my co-pending patent application, "Means for Pulling Tape From A Real" Ser. No. 579,776, filed Feb. 11, 1984, now U.S. Pat. No. 4,572,460.

The mechanism for joining the tape leaders, which is the subject matter of the present application, includes an elongated member which has a finger like protrusion and a cam protrusion at one end thereof. At the other end, the elongated member has a relatively long aperture which is fitted over a stud. The elongated member can rotationally and linearly move about said stud. In addition the elongated member is rotationally coupled to a crank. The crank is in turn rotationally coupled to a cam follower as well as a pivot means. The crank, cam follower and elongated member are arranged so that when the housing, which holds a supply reel, is moved toward the mechanism for joining the tape leaders, it (the housing) bumps into and moves the cam follower. The mechanism operates such that initially the elongated member engages the tape leader from the take up reel and moves the tab to an extended position. Thereafter the locking slot in the supply reel leader passes over the tab as the housing of the supply reel is moved toward the mechanism for joining tape leaders. At this point of the operation the tab is cammed through the slot by the cam protrusion of the elongated member. Subsequently as the housing moves against the cam follower the elongated member moves in a translational fashion to ca the tab into a position so that in response to pulling the take up leader, the take up leader tab becomes locked in the locking slot of the supply tap leader. As the housing for the supply reel is moved further toward its operating position (and continues to move the cam follower) the elongated member is moved so that the finger like protrusion is retracted out of the positioning slot and the cam protrusion is directed away from the locked leaders. Accordingly the take up leader and the supply tape leader are locked, or buckled, for the operation of moving the tape from the supply reel, past a read head, onto the take up reel.

The objects and features of the present invention will be better understood in view of the following description studied in conjunction with the drawings wherein.

Figure 1:
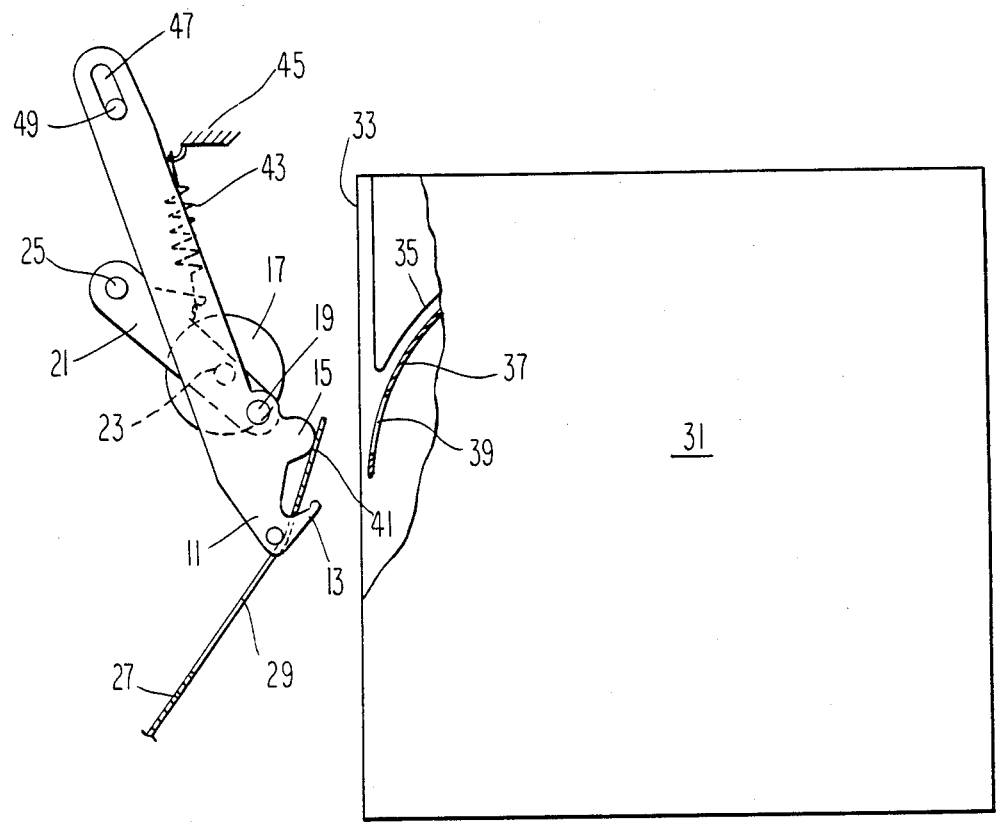
FIG. 1 depicts the elongated member holding the take up leader prior to locking it in the supply tape leader.

Consider FIG. 1. In FIG. 1 there is shown an elongated member 11. As can be seen in FIG. 1, the lower end of the elongated member 11 it is formed into a finger like protrusion 13 and a cam protrusion 15. Also as can be seen in FIG. 1, the elongated member 11 is coupled to a crank 21 by a stud 19. The crank 21 is rotationally coupled by a stud 23 to a cam follower 17. The crank 21 is rotationally coupled to stud 25. As will become apparent, hereinafter, the function of the linkage arrangement (i.e. the crank 21, the cam follower 17 and their rotational coupling design) is to enable the elongated member to first pull the take up reel leader into a extended position for joining with the supply reel leader; secondly cam the tab of the take up leader into the locking slot of the supply tape leader; and thirdly retract the finger like protrusion from the positioning slot of the take up leader and simultaneously move the cam protrusion "out of the way" when the leaders have been joined together. Other forms of mechanical linkage arrangement could be used to maneuver the elongated member so as to accomplish its purpose.

In FIG. 1 the take up leader 27 is shown with the finger like protrusion 13 fitted through the positioning slot 29. The positioning slot 29 can be seen in FIGS. 5 (A, B and C) and is depicted in FIG. 1 as a clear section of the leader as opposed to a solid line. Also in FIG. 1 a top view of a portion of the housing 31 of the supply reel is shown. It should be understood that the housing 31 is three dimensional extending u from the drawing toward the viewer and that its lower edge 33 serves as a cam. The lower edge 33 moves the cam follower 17 as the housing 31 i moved to the left of the drawing to its ultimate operating position.

The housing 31 moves within two guide rails, not shown, and comes to rest against a bumper means when it is in the correct operating position. The guide rails and the bumper enable the user to quickly insert the cartridge, (i.e. the housing 31 with the supply reel located therein) and to automatically join the two leaders.

As can be seen in FIG. 1, the housing 31 has a channel 35 formed therein from whence the supply tape leader 37 extends. The supply tape leader 37 has a locking slot 39 which can be readily seen in FIG. 5 (A, B and C) and which is shown as a clear area in FIG. 1. It should be understood that (in a preferred embodiment) the leaders 27 and 37 are made of a polyester material with a thickness of 0.004 to 0.010 mils. Accordingly the leaders are relatively stiff to accommodate the automatic maneuvering of the tab into the locking slot. The tab which has been mentioned above is depicted in FIG. 1 as tab 41. The shape of the tab 41 can be better appreciated in FIG. 5. While in a preferred embodiment the tab 41 is shown to substantially resemble a mushroom, other shapes could be used.

It should be further noted that the crank 21 is spring loaded by the spring 43 to move the linkage arrangement against the stop stud 45. When the linkage is moved against the stop stud 45 the take u leader 27 is in the correct position to be inserted into the locking slot of the supply tape leader 37. While it is preferable to spring load the mechanism it will operate without spring loading provided the linkage is moved to properly locate the tab 41.

It should be noted that at the top end of the elongated member 11 there is formed an elongated aperture 47. The aperture 47 fits over the stud 49 and such an arrangement permits the elongated member 11 to move both rotationally and linearly, which translational movement is needed to enable the elongated member to cam the tab into the locking slot and at a later time move it "out of the way".

Figure 2:
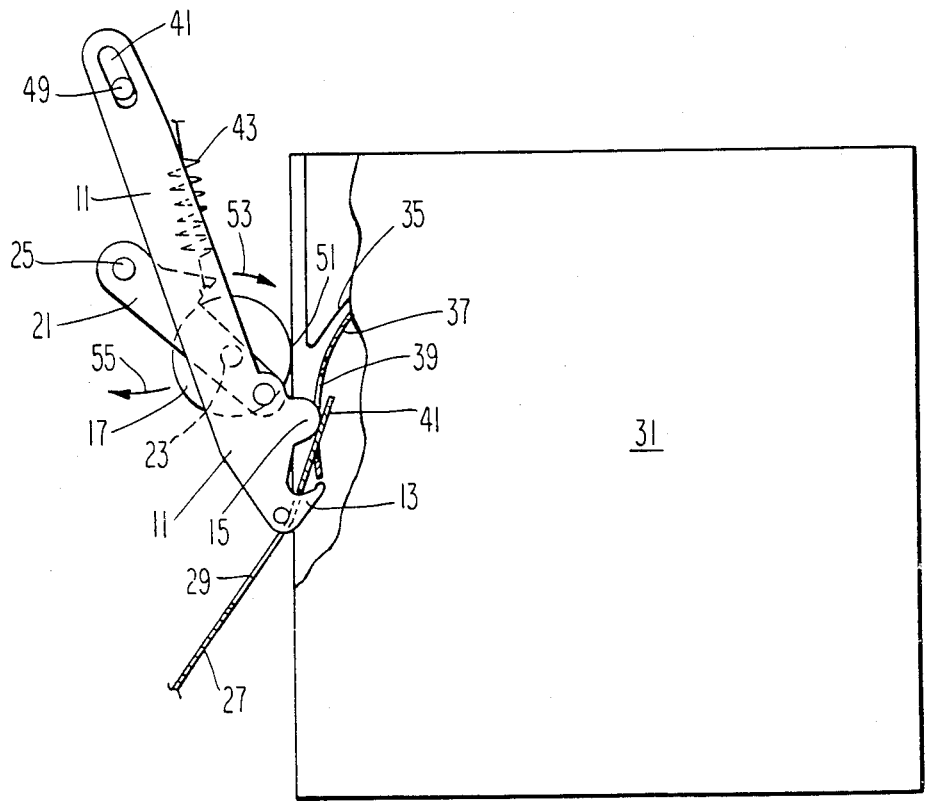
FIG. 2 depicts the tab of the take up leader when it is first inserted into the locking slot at the supply tape leader.

Consider FIG. 2. In FIG. 2 the housing 31 is shown in a position where its lower edge 33 is about to commence moving, or camming, the cam follower 17. In this initial camming position, the cam protrusion 15 has pushed the tab 41 substantially through the locking slot 39. It should be understood that depending upon the design of the leaders and the wishes of the user, the elongated member 11, the linkage arrangement and in particular the cam protrusion 15 can all be designed to move the tab 41 more or less completely through the locking slot 39. In FIG. 2 it can be seen that the lower edge 33 abuts the cam follower 17 at point 51.

As the housing 31 is moved to the left, within its guide rails, it pushes the cam follower 17 which "rolls", as shown by arrow 53, and pivots around the stud 23. In addition the crank 21 commence a slight rotational movement (arrow 55) about the stud 25. The foregoing movement of the linkage causes the cam protrusion 15 to cam or push, the tab 41 further into the locking slot as the locking slot is pushed toward the cam protrusion 15.

Figure 3:
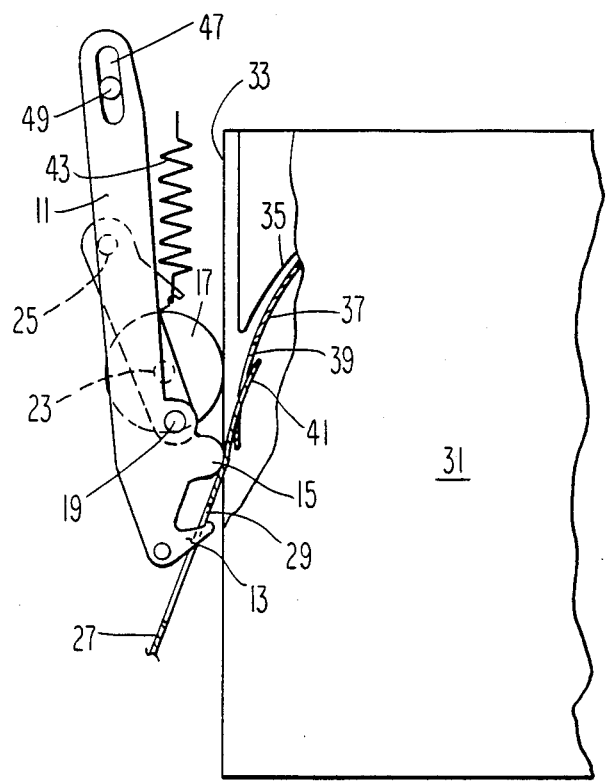
FIG. 3 depicts the arrangement as the housing of the supply reel moves the cam follower.

Consider FIG. 3. In FIG. 3 the housing 31 is shown moved considerably to the left. Under the conditions shown in FIG. 3, the housing 31 has not yet gotten to the end of its travel, i.e. into its operating position. However in the intermediate position shown in FIG. 3, the tab 41 is shown pushed well into the locking slot 39. As can be determined from FIG. 5A when the tab 41 is well into the slot, the stem 57 is located in the narrow section 59 so that as the take up leader 27 is moved away from (in a pulling direction) the supply tape leader 37, the stem 57 will pass through the narrow section 59 but the tab 41 will be blocked. To say it another way, the overlap sections 61 and 63 will abut the outer limits 65 and 67 of the narrow section 59 and the leaders will become buckled. At this point in the buckling procedure the take up leader is pulled toward the bottom of the drawing to cause the stem 57 to pass through the narrow section 59 while the tab becomes blocked. The pulling can be effected by providing power to the take up reel or by manually winding the take up reel.

Figure 4:
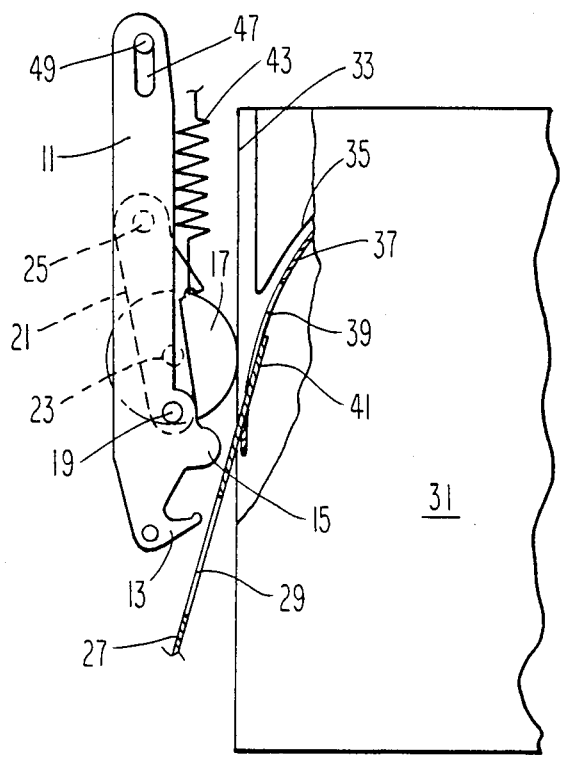
FIG. 4 depicts the arrangement when the housing of the supply reel reaches its operating position.

Consider FIG. 4. In FIG. 4 the housing 31 is shown having been moved considerably to the left to come into contact with bumper 69. In FIG. 4 the housing 31 is shown in its operating position. As can be seen in FIG. 4 the elongated member 11 has been moved away from the take up leader. The finge like protrusion 13 has slipped out of the positioning slot 29 and the cam protrusion 15 has moved out of the locking slot 39. As can be further seen in FIG. 4 the tape leaders 27 and 37 are joined for operation, that is the pulling of the supply tape from the housing 31 and the taking up thereof by the take up reel.

Figure 5A:
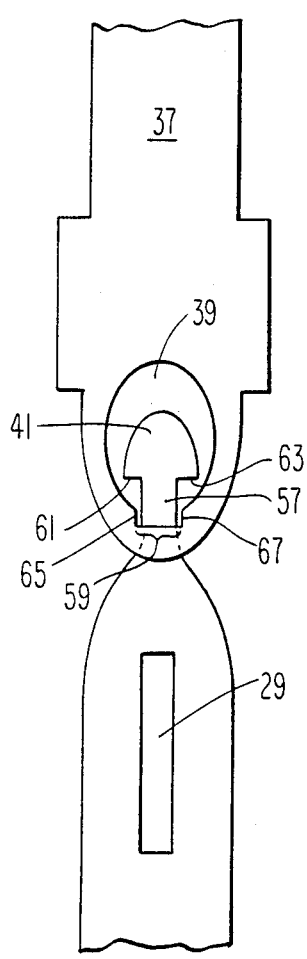
FIGS. 5A, 5B and 5C depict the take up leader and supply tape leader in succeeding stages of being buckled.
Figure 5B:
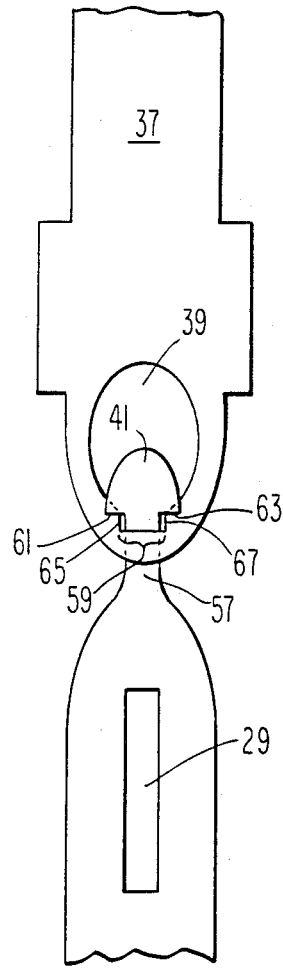
Figure 5C:
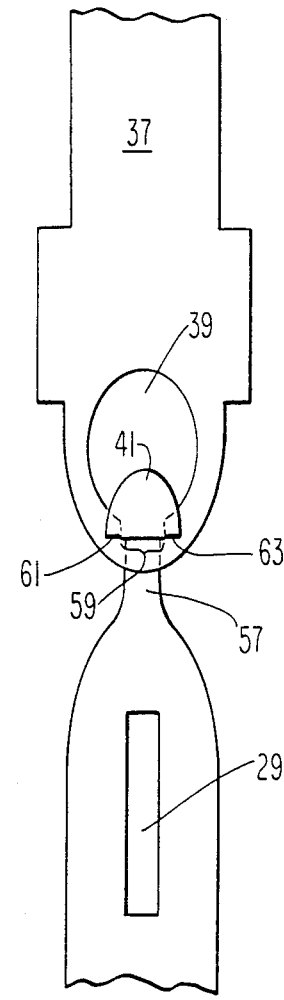

FIGS. 5 (A, B, and C) show the take up reel leader 27 being inserted in three steps into the supply tap leader 37. The prerequisites for the leaders 27 and 37 is that they be stiff enough to accommodate the operation described, that one section of the locking slot be wide enough to accept the tab and that another section be narro enough to pass the stem but block the tab when the take up leader is pulled. These features and their relationship is apparent from FIGS. 5A, 5B and 5C.

It should be recognized that the joining of the leaders is quite automatic in response to the supply reel housing being inserted into its operating position as described above.

I claim:

1. A mechanism for joining a first tape leader with a second tape leader, said first tape leader having one end secured to a take up tape reel and a second end with a tab supported by a stem section that is narrower than said tab, said second tape leader having one end connected to tape on a supply tape reel rotatably positioned within a housing and a second end with a locking slot therein, wherein said locking slot comprises a first portion sized to permit said tab to pass therethrough and a second portion toward the second end of said second tape leader, said second portion sized to prevent said tab from passing therethrough, while permitting said stem section to pass therethrough, whereby, upon locking said first and second tape leaders together, tape may be transferred between said take up tape reel and said supply tape reel along a tape path, said mechanism comprising:

means for positioning said first tape leader substanially within the tape path, and means for guiding said housing from and inactive position to an active position such that the movement of said housing to the active position causes said tab of said first tape leader to enter and extend through said first portion of said locking aperture so that rotation of the take up reel to pull said first tape leader draws said stem section into said second portion of said locking aperture to thereby lock said first and second tape leaders together.

2. A mechanism according to claim 1 wherein said housing includes a channel in said housing through which said second tape leader extends and said means for positioning includes means for releasably supporting said first tape leader.

3. A mechanism according to claim 2 wherein said means for releasably supporting includes a projecting member adapted for pushing said tab of said first tape leader through said first portion of said locking aperture in said second tape leader.

4. A mechanism according to claim 3 wherein said means for releasably supporting releases said first tape leader after said tab of said first tape leader is pushed through said locking aperture.

5. A mechanism according to claim 4 wherein said means for releasably supporting includes a finger like protrusion sized to extend through an aperture in said first tape leader such that said first tape leader is supported thereby.

6. A mechanism according to claim 2 wherein said means for releasably supporting said first tape leader is an elongated member having a cam projection adapted for pushing said tab through said first portion of said locking aperture and a finger like protrusion sized to extend through a positioning aperture in said first tape leader such that said first tape leader can be positioned and supported and thereby.

7. A mechanism according to claim 6 wherein said finger like protrusion exits the positioning aperture in said first tape leader after said tab of said first tape leader extends through said first portion of said locking aperture whereby said first tape leader is released from said means for releasably supporting.

8. A mechanism according to claim 1 wherein said housing includes passive deflection means for changing the angle of incidence of the second tape leader with respect to the first tape leader upon the locking together of the first and second tape leaders.

9. A mechanism according to claim 8 wherein said passive deflection means comprises a channel in said housing through which said second tape leader extends, wherein the width of said second tape leader is less than the width of said channel except in the region immediately adjacent to the locking slot, and wherein said second tape leader further comprises a shoulder portion surrounding said locking slot and having a width greater than the width of the channel which shoulder is adapted to cooperate with the channel to deflect said second tape leader.

10. An arrangement to automatically lock a leader of a supply tape with a leader of a take up tape comprising in combination:

a quantity of supply tape means having a supply leader section, said supply leader section having an aperture therein; reel means having said supply tape means wrapped thereon; housing means having an upper section and a lower section and holding said reel means for rotation, said housing means formed to have a curved inner wall in said upper section whereby said supply leader section is held to be curved downward so that said aperture in said supply leader section is characterized by a substantial horizontal component; take up reel leader means; and means holding said take up reel leader means in a curved upward position to overlay said aperture in said supply leader section whereby as said take up reel leader moves downwardly it will lock into said aperture in said supply leader section.

* * * * *